(12) United States Patent
Casparian et al.

(10) Patent No.: US 8,259,080 B2
(45) Date of Patent: Sep. 4, 2012

(54) INFORMATION HANDLING SYSTEM DISPLAY DEVICE AND METHODS THEREOF

(75) Inventors: Mark Casparian, Miami, FL (US);
Reginald Rego, Palmetto Bay, FL (US);
Frank Azor, Miami, FL (US); David Estrada, Miami, FL (US); Antonios Berry, Miami, FL (US); Brian Cooper, Miami, FL (US); Jeffrey Cubillos, Miami, FL (US); Gabriel Gonzalez, Miami, FL (US)

(73) Assignee: Dell Products, LP, Round Rock, TX (US)

( * ) Notice: Subject to any disclaimer, the term of this patent is extended or adjusted under 35 U.S.C. 154(b) by 904 days.

(21) Appl. No.: 12/059,261

(22) Filed: Mar. 31, 2008

(65) Prior Publication Data

US 2009/0244016 A1    Oct. 1, 2009

(51) Int. Cl.
*G06F 3/41*        (2006.01)
(52) U.S. Cl. .................... 345/173; 345/178
(58) Field of Classification Search ............ 345/1.1, 345/2.3, 55, 156–158, 168, 173–184, 730; 455/566, 556.1, 575.1; 178/18.01–18.03, 178/19.01; 715/781, 852, 803, 728, 761; 463/16, 1, 2, 26; 348/14.16
See application file for complete search history.

(56) References Cited

U.S. PATENT DOCUMENTS

| | | | | |
|---|---|---|---|---|
| 5,986,634 A * | 11/1999 | Alioshin et al. | ............. | 345/649 |
| 6,333,753 B1 * | 12/2001 | Hinckley | ............. | 715/768 |
| 6,456,275 B1 * | 9/2002 | Hinckley et al. | ............. | 345/156 |
| 6,763,226 B1 * | 7/2004 | McZeal, Jr. | ............. | 455/90.2 |
| 6,775,560 B2 * | 8/2004 | King et al. | ............. | 455/566 |
| 7,289,102 B2 * | 10/2007 | Hinckley et al. | ............. | 345/156 |
| 7,800,592 B2 * | 9/2010 | Kerr et al. | ............. | 345/173 |
| 7,884,807 B2 * | 2/2011 | Hovden et al. | ............. | 345/173 |
| 8,004,501 B2 * | 8/2011 | Harrison | ............. | 345/174 |
| 2002/0186236 A1 * | 12/2002 | Brown et al. | ............. | 345/730 |
| 2004/0185920 A1 * | 9/2004 | Choi et al. | ............. | 455/575.1 |
| 2004/0204126 A1 * | 10/2004 | Reyes et al. | ............. | 455/566 |
| 2006/0197750 A1 * | 9/2006 | Kerr et al. | ............. | 345/173 |
| 2007/0026371 A1 * | 2/2007 | Wood | ............. | 434/317 |
| 2007/0035616 A1 * | 2/2007 | Lee et al. | ............. | 348/14.16 |
| 2007/0109276 A1 * | 5/2007 | Kim et al. | ............. | 345/173 |
| 2007/0157856 A1 * | 7/2007 | Skoog et al. | ............. | 108/70 |
| 2007/0178952 A1 * | 8/2007 | Ehara et al. | ............. | 463/1 |
| 2007/0262953 A1 * | 11/2007 | Zackschewski | ............. | 345/156 |
| 2007/0279315 A1 * | 12/2007 | Laves et al. | ............. | 345/1.1 |
| 2008/0058049 A1 * | 3/2008 | Lutnick et al. | ............. | 463/16 |
| 2008/0102916 A1 * | 5/2008 | Kovacs et al. | ............. | 463/16 |
| 2008/0150911 A1 * | 6/2008 | Harrison | ............. | 345/173 |
| 2008/0165150 A1 * | 7/2008 | Kwon | ............. | 345/173 |
| 2008/0268901 A1 * | 10/2008 | Miramontes | ............. | 455/556.1 |
| 2009/0093300 A1 * | 4/2009 | Lutnick et al. | ............. | 463/26 |
| 2009/0153438 A1 * | 6/2009 | Miller et al. | ............. | 345/55 |
| 2010/0053218 A1 * | 3/2010 | Risher-Kelly | ............. | 345/649 |

OTHER PUBLICATIONS

VBR666, "Dualview: Using Primary Desktop for Playing a Game and Secondary for Watching a Movie", nV News Forums, Jan. 30, 2005-Jan. 31, 2005, pp. 1-6.

* cited by examiner

*Primary Examiner* — Prabodh M Dharia
(74) *Attorney, Agent, or Firm* — Larson Newman, LLP

(57) ABSTRACT

An information handling system includes two touch screens. In one embodiment, one of the touch screens is incorporated in a base of the information handling system and the other is incorporated in a lid of the information handling system. An application can display different informational views in each touch screen, allowing a user to interact with the data in each screen independently.

20 Claims, 4 Drawing Sheets

INFORMATION HANDLING SYSTEM DISPLAY DEVICE AND METHODS THEREOF

FIELD OF THE DISCLOSURE

The present disclosure relates to information handling systems and more particularly to display devices for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Typical information handling systems use one or more standard interface devices, such as a keyboard or a mouse, to allow a user to interact with an application program. However, as application programs grow in complexity, providing users with a number of different options, the ability of a user to perform tasks with these conventional interface devices diminishes. For example, to perform a particular task, the user may have to access several menus, sub-menus, and option boxes. Such interaction can become cumbersome, resulting in a poor user experience. Some application programs provide a toolbox or similar interface that allows a user to perform a task or select an option by actuating a virtual button. However, as the number of options grows so too does the number of buttons, limiting display space for other information. Accordingly, an improved interface device for an information handling system would be useful.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
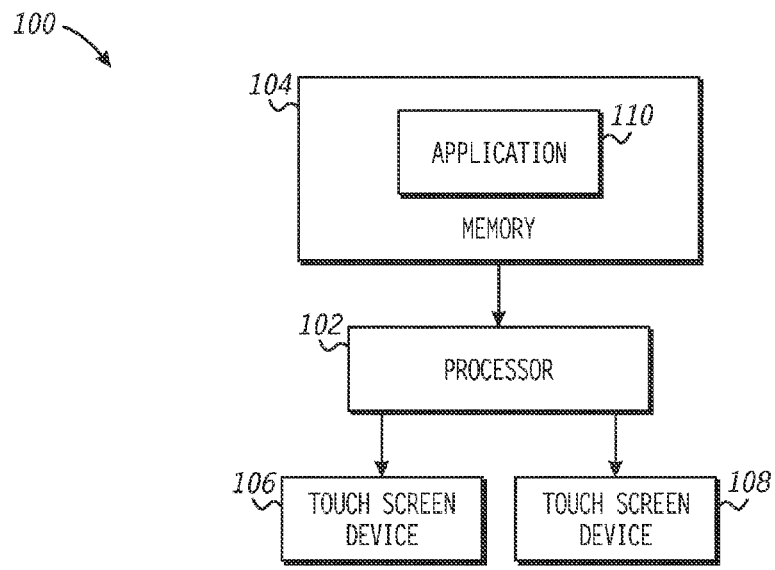
FIG. 1 is a block diagram of an information handling system in accordance with one embodiment of the present disclosure.

FIG. 1 illustrates a block diagram of an exemplary embodiment of an information handling system 100. In one form, the information handling system 100 can be a computer system such as a personal computer. As shown in FIG. 1, the information handling system 100 can include a first physical processor 102 and a memory 104. In an embodiment, the information handling system 100 can support multiple processors and can allow for simultaneous processing of multiple processors and support the exchange of information within the system.

The memory 104 can be a volatile memory, such as a random access memory (RAM), or non-volatile memory such as flash memory or a hard disk. The memory 104 is configured to store application programs, such as application 110. The information handling system 100 also includes touch screen displays 106 and 108, which are each connected to the processor 102.

The application 110 includes instructions to manipulate the processor 102 to execute designated tasks. To illustrate, the application 110 can control the processor 102 to provide display information to each of the touch screen devices 106 and 108. The touch screen devices 106 and 108 are configured to display the provided display information. In an embodiment, the display information provided to each touch screen device represents a different input screen for the application 110. As used herein, an input screen is a screen configured for display at a touch screen device that allows a user, by interacting with the touch screen device, to provide input information for an application. Interaction can include touching locations on the touch screen device, performing touch gestures (e.g. movement of a finger across the touch screen device), multi-touch gestures (e.g. movement of more than one finger across the touch screen device, where the particular input is based on the movement of each finger), and the like.

The touch screen devices 106 and 108 are further configured to, in response to interaction at the device, provide information indicative of the interaction to the processor 102. Based on the interaction, the processor 102 can take appropriate action including performing a requested task, changing information stored at the memory 104, and the like. In an embodiment, in response to an interaction at one of the touch screen devices 106 and 108, the processor 102 changes the display information provide to one or more of the touch screen devices. Accordingly, interaction at one of the touch screen devices 106 and 108 can change the information displayed at the other device.

The operation of the information handling system 100 can be better understood with reference to exemplary operations. In one embodiment, the application 110 is a game program, and provides information for display at the touch screen device 106 and 108 representing different game views. As used herein, a game view refers to a display related to a particular aspect of a game. Thus, in a role-playing game or shooter game, touch screen device 106 can display the game environment visible to a player's character, while the touch screen 108 simultaneously displays an inventory screen that displays equipment, spells, or other options available for the character. Further, a user can independently interact with each touch screen device to provide independent inputs to the game program. Thus, a user could interact with the touch screen device 106 to select a target to attack or an object to pick up, and interact with the touch screen device 108 to select an inventory item, such as a weapon or spell to attack with. The application 110, executing at the processor 102, interprets the interactions at each of the touch screen devices and 108 and takes the appropriate action, including updating state variables and other information so that the game state reflects the interactions.

In another embodiment, the application 110 is a game program that displays different game environment views at each of the touch screen devices 106 and 108. For example, the application 110 can provide information to the touch screen device 106 so that a detailed map of a particular game location is displayed, and provide information to the touch screen device 108 so that a less detailed map (e.g. a "world map") of a broader portion of the game environment is displayed. User interactions at one of the touch screen devices 106 and 108 can change the display in the other. For example, a user could interact with the touch screen device 108 to select a particular portion of the game environment to view. In response to this interaction, the application 110 can change the display information provided to the touch screen device 106 so that it displays a detailed view of the selected portion.

By separating game views between the touch screen 106 and touch screen 108, the user experience with application 110 can be enhanced. For example, by displaying particular game options at touch screen 108, the available area to display a game environment or other game screen at touch screen device 106 is increased. In addition, multiple options and input screens can be displayed simultaneously, improving the flexibility with which a player can interact with the game.

In another embodiment, the application 110 is a graphics program, such as a drawing program, that allows a user to create graphical objects. Accordingly, the application 110 can provide information to the touch screen device 106 to display a virtual canvas. The user can interact with the touch screen device 106 to draw items directly on the screen. In response, the touch screen device 106 provides information to the application 110 representing the interactions, allowing the application to create and change program objects representing the drawn items. In addition, simultaneous to displaying the virtual canvas at the touch screen device 106, the application 110 can display a virtual "toolbox" at the touch screen device 108. The virtual toolbox provides a set of options to determine how a user's interactions with the virtual canvas will be manifested. For example, the virtual toolbox can provide a set of brush options, with each brush associated with a different pixel size. Accordingly, if a brush is selected, lines drawn by a user on the virtual canvas at the touch screen 106 will be sized based on the pixel size associated with the selected brush. The user can select a particular option in the virtual toolbox by interacting with the touch screen device 108. For example, the options can be displayed as a set of virtual buttons, and a user touch the screen of the touch screen device 108 to actuate a button, thereby selecting the associated option. In response to selection of an option, the touch screen device 108 provides information to the application 110 indicating the selection. Based on the selection, the application 110 can change the information displayed at the touch screen device 106. For example, selection of a particular option can change the color, format, font, or other attribute of an object displayed at the touch screen device 106.

Figures 2, 3:
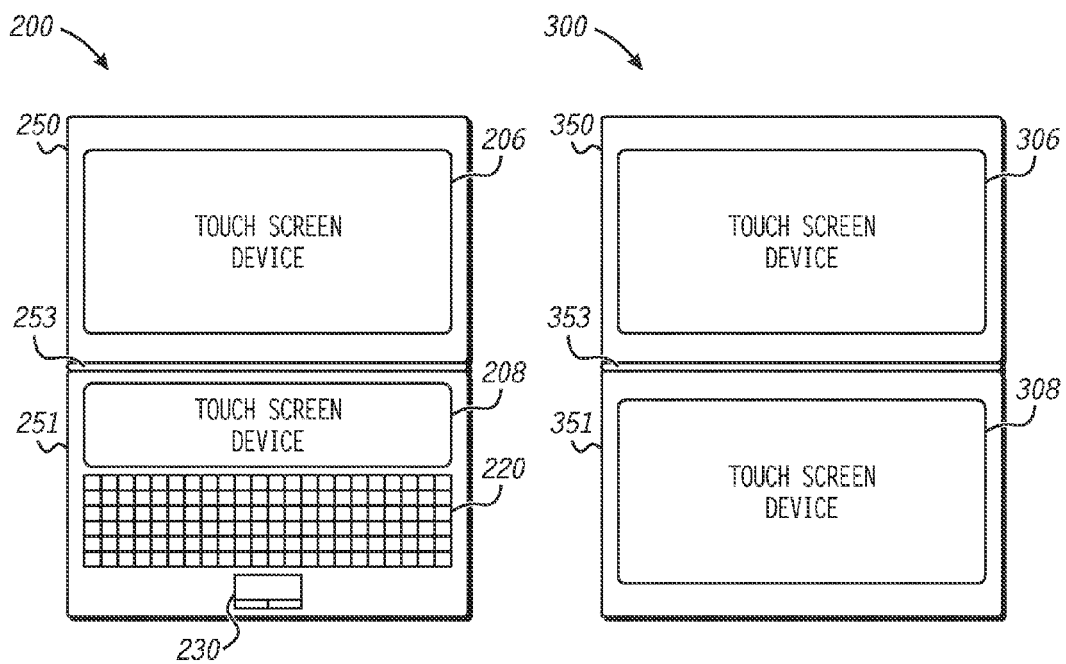
FIG. 2 is a diagram of an external view of an information handling system in accordance with one embodiment of the present disclosure.
FIG. 3 is a diagram of an external view of an information handling system in accordance with another embodiment of the present disclosure.

FIG. 2 illustrates a particular embodiment of an information handling system 200, corresponding to the information handling device 100 of FIG. 1. As illustrated, the information handling system 200 is a portable computer device including a lid, or top, 250 and a base 251. The top 250 and base 251 are connected by a hinge 253, so that the information handling device 200 is configured in a clamshell arrangement.

The information handling device 200 also includes a keyboard 220, a touch-pad 230, and touch screen devices 206 and 208, corresponding to touch screen devices 106 and 108 of FIG. 1. As illustrated, the touch screen device 208 is integrated into the base 251, together with the keyboard 220 and the touch-pad 230. The touch screen device 206 is integrated with the lid 250.

In operation, the touch screen devices 206 and 208 can display information, and a user can interact with each device as described above with respect to FIG. 1. In addition, a user can interact with information displayed at each of the touch screen devices 206 and 208 by interacting with the keyboard 220 and the touch-pad 230. Thus, text typed at the keyboard 220 can be displayed at either or both of the touch screen device 206 and the touch screen device 208. In an embodiment, the particular touch screen device subject to interaction with the keyboard 220 or the touch-pad 230 can be selected by a user. For example, by executing a particular gesture at the touch screen 208, a user can select that touch screen to be subject to interactions at the keyboard 220.

This operation can be better understood with reference to an example. In an embodiment, a chat program is displayed at the touch screen device 208, while a word-processor program is displayed at the touch screen device 206. By tapping on the touch screen device 208, the user selects the touch screen for interaction, so that text typed at the keyboard 220 will be displayed at the chat program, but not at the word processor program.

FIG. 3 illustrates a particular embodiment of an information handling system 300, corresponding to the information handling device 100 of FIG. 1. As illustrated, the information handling system 300 is a portable computer device including a lid, 350 and a base 351. The top 350 and base 351 are connected by a hinge 353. The touch screen device 308 is integrated into the base 351, while the touch screen device 306 is integrated with the lid 350.

In the illustrated embodiment, the information handling system 300 does not include a physical keyboard device. A virtual keyboard can be displayed at one of the touch screen devices 306 and 308, allowing interaction with information displayed at the same or other touch screen device. For example, the touch screen device 306 can display a word processor program, and the touch screen device 308 display a virtual keyboard. By typing on the virtual keyboard, a user can provide information to the word processor program displayed at the touch screen device 308. For example, text can be entered at the virtual keyboard for entry into a word-processing document and display at the touch screen device 306. A user can also interact with the touch screen device 306 to select text, move text, turn pages, and the like.

Figure 4:
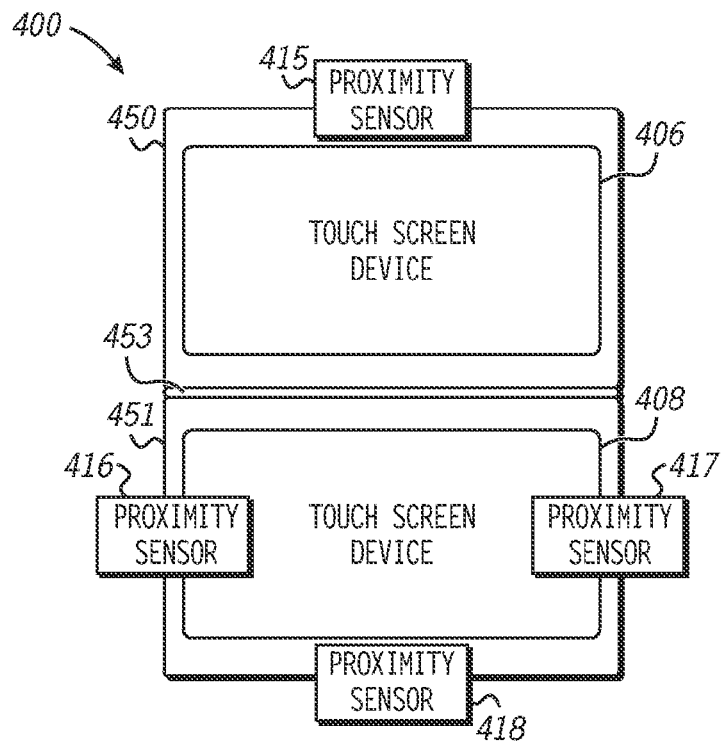
FIG. 4 is a block diagram of an information handling system having proximity sensors in accordance with one embodiment of the present disclosure.

FIG. 4 illustrates a particular embodiment of an information handling system 400, corresponding to the information handling device 100 of FIG. 1. As illustrated, the information handling system 400 is a portable computer device including a lid, 450 and a base 451 connected via a hinge 453. A touch screen device 408 is integrated into the base 451, while a touch screen device 406 is integrated with the lid 450. The information handling system 400 also includes a proximity sensor 415, integrated with the lid 450 and proximity sensors 416, 417, and 418, integrated with the base 451.

Each of the proximity sensors 415-418 is configured to sense the proximity of a user to the sensor. In an embodiment, the proximity sensors 415-418 may be infrared, microwave, acoustic proximity or capacitive proximity based sensor-detectors configured to sense changes near the detector indicating the user's proximity to the sensor.

The information handling device 400 is configured to orient display of information at the touch screen devices 406-408 based on information provided by the proximity sensors 415-418 indicating the position of one or more users. For example, if the proximity sensors 415-418 indicate that a user is located nearest the proximity sensor 416, the information handling system can orient display of information at each of the touch screen devices 406 and 408 so that the user can appropriately interact with the displayed information. For example, if the touch screen device 408 is displaying a map, the information handling device can orient display of the map so that lower border of the map is displayed at the border of the touch screen device 408 nearest the proximity sensor 416.

In addition, the information displayed at the touch screen devices 406 and 408 and be individually oriented based on the proximity of multiple users. For example, the information handling system 400 can be executing a game program played by two players, whereby one player interacts with one of the touch screen devices 406 and 408, and the other player interacts with the other touch screen device. Accordingly, the information handling system 400 can individually orient the display of information at each of the touch screen devices 406 and 408 based on the relative position of each user to the proximity sensors 415-418.

Figure 5:
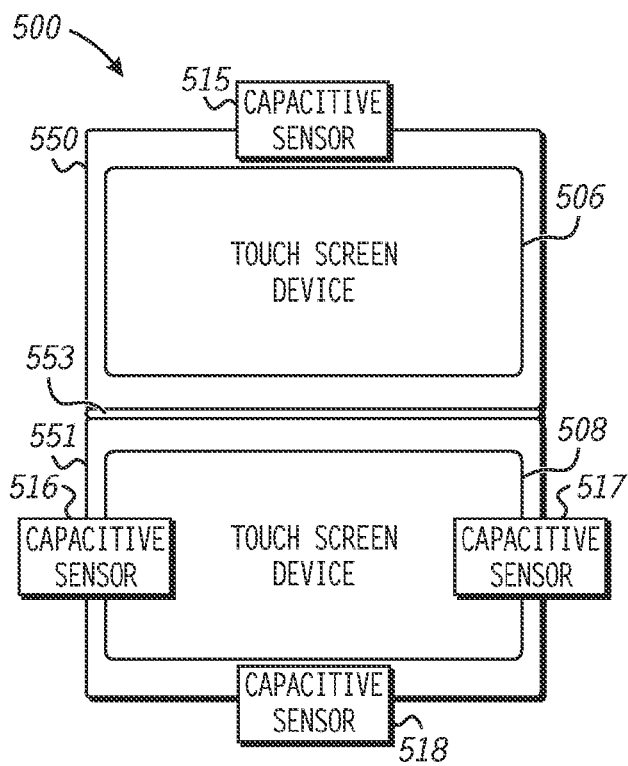
FIG. 5 is a block diagram of an information handling system having capacitive sensors in accordance with one embodiment of the present disclosure

FIG. 5 illustrates a particular embodiment of an information handling system 500, corresponding to the information handling device 100 of FIG. 1. As illustrated, the information handling system 500 is a portable computer device including a lid 550 and a base 551 connected by a hinge 553. A touch screen device 508 is integrated into the base 551, while a touch screen device 506 is integrated with the lid 550. The information handling system 500 also includes a capacitive sensor 515, integrated with the lid 550, and capacitive sensors 516, 517, and 518, integrated with the base 551.

The capacitive sensors 515-518 provide information to enable the information handling system 500 to determine an orientation of the system, and orient display of information displayed at the touch screen devices 506 and 508 based on the orientation. Thus, if a user rotates the information handling system 500 relative to the user, the information displayed at each of the touch screen devices 506 and 508 can be changed to maintain the same orientation with respect to the user.

Figure 6:
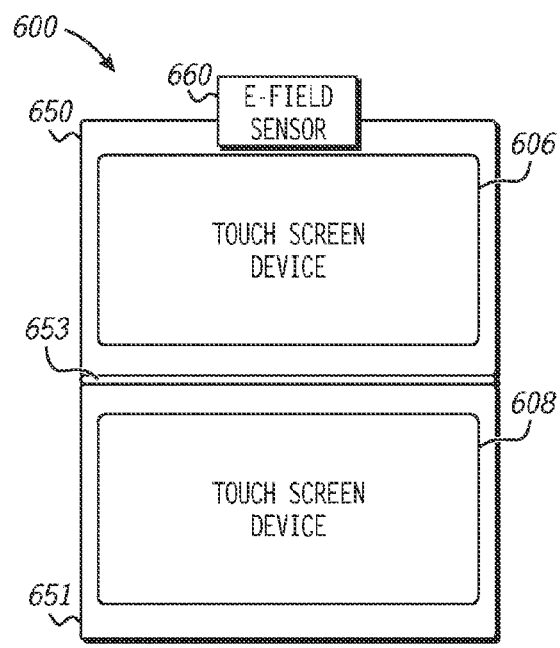
FIG. 6 is a block diagram of an information handling system having an electromagnetic field sensor in accordance with an alternative embodiment of the present disclosure.

FIG. 6 illustrates a particular embodiment of an information handling system 600, corresponding to the information handling device 100 of FIG. 1. As illustrated, the information handling system 600 is a portable computer device including a lid 650 and a base 651 connected via a hinge 653. A touch screen device 608 is integrated into the base 651, while a touch screen device 606 is integrated with the lid 650. The information handling system 500 also includes an electromagnetic field (E-field) sensor 660, integrated with the lid 650.

The E-field sensor 660 is configured to sense changes in an electromagnetic field near the sensor, and to provide information to the information handling system 600 indicative of the changes. In particular, a user can gesture in proximity to the E-field sensor 660 in order to interact with information displayed at one or both of the touch screen devices 606 and 608. The gesture causes a change in the electromagnetic field, and the E-field sensor 660 provides information to the information handling system 600 indicative of the changes. Based on the information, the information handling system 600 determines the gesture made by the user, and changes the information displayed at the touch screen devices 606 and 608 accordingly.

For example, if a user pushes his hand towards the E-field sensor 660, this can indicate a "zoom" gesture. Accordingly, in response to the gesture, the information handling system can enlarge a portion of the information displayed at one or both of the touch screen devices 606 and 608. In addition, if a user moves his hand left or right near the E-field sensor 660, this can indicate a "pan" gesture, and cause the information displayed at one or both of the touch screen devices 606 and 608 to change to show a left or right pan. Other gestures, and corresponding changes in the displayed information, can include selection gestures (selecting a displayed object), rotation gestures (rotating a displayed object), and the like.

Figures 7, 8:
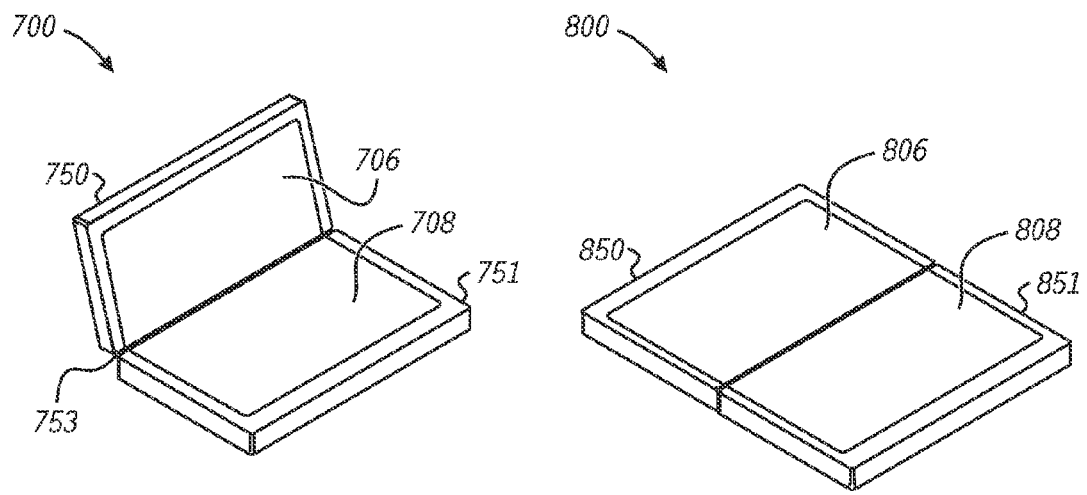
FIG. 7 is a diagram showing one arrangement of an information handling system in accordance with one embodiment of the present disclosure.
FIG. 8 is a diagram showing an alternative arrangement of the information handling system of FIG. 7.

FIG. 7 illustrates a particular embodiment of an information handling system 700, corresponding to the information handling device 100 of FIG. 1. As illustrated, the information handling system 700 is a portable computer device including a lid 750 and a base 751 joined by a hinge 753. A touch screen device 708 is integrated into the base 751, while a touch screen device 706 is integrated with the lid 750. As illustrated, an edge of each of the touch screen devices 706 and 708 are coincident or nearly coincident with the hinge 753. This allows the touch screen devices 706 and 708 to be placed in an arrangement such that the devices for a substantially continuous visual display.

This arrangement can be better understood with reference to FIG. 8, which illustrates an information handling system 800 corresponding to the information handling system 700 in a different arrangement. The information handling system 800 includes a lid 850 and a base 851, corresponding respectively to the lid 750 and base 751 of FIG. 7. The information handling system 800 also includes touch screen devices 806 and 808, corresponding to the touch screen devices 706 and 708, respectively.

In the illustrated arrangement of FIG. 7, the touch screens 706 and 708 are arranged so that the screens for a discontinuous visual display. This allows a user to work with the information handling system 700 as a conventional portable computer. For example, a virtual keyboard can be displayed at the touch screen device 708, allowing a user to interact with a word processor program displayed at the touch screen device 706.

By pressing downward on the lid 750 until it is in a parallel arrangement with the base 751, a user can achieve the arrangement of information handling system 800. In this arrangement, the touch screen devices 806 and 808 for a substantially continuous visual display. In an embodiment, the information handling system 800 is able, based on information provided by sensors (not shown) in one or both of the lid 850 and base 851, to detect when the information handling system 800 has been placed in the illustrated arrangement. In response, the information handling system 800 can change the information displayed at the touch screen devices 806 and 808 so that the devices together form a single display.

For example, when the touch screen devices 806 and 808 are in an angled arrangement (similar to touch screen devices 706 and 708 of FIG. 7), a user can select a picture for display. In response, the information handling system displays the selected picture at the touch screen device 806. In response to the user placing the information handling system 800 in the illustrated arrangement of FIG. 8, so that the touch screen devices 806 and 808 form a substantially continuous visual display, the information handling system can enlarge the displayed picture so that the picture is displayed across the touch screen devices. Thus, a user can work with the information handling system 800 as a conventional portable computer, and also use the system as a large interactive display.

Figure 9:
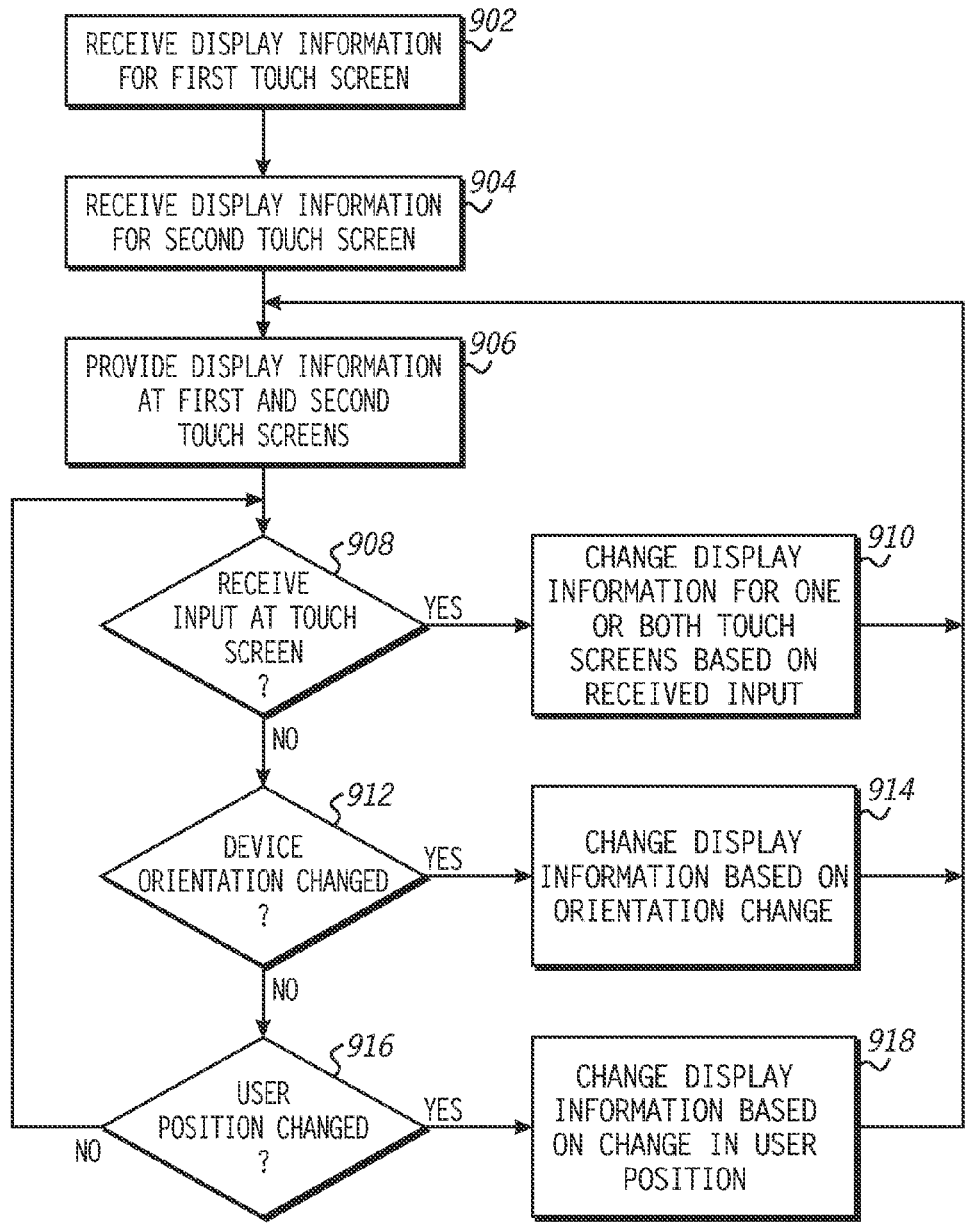
FIG. 9 is a flow diagram of a method of receiving information for display at an information handling system in accordance with one embodiment of the present disclosure.

Referring to FIG. 9, a flow diagram of a particular embodiment of a method of displaying information at a plurality of touch screens is illustrated. At block 902 display information to be displayed at a first touch screen device is received, while at block 904 display information to be displayed at a second touch screen device is received. In an embodiment, the first and second touch screens are integrated with a common portable computer. At block 906, the display information for each of the touch screen devices is provided to the associated device for display.

At block 908, it is determined whether an input has been received at either touch screen device. If so, the method flow proceeds to block 910, and the display information for one or both of the touch screen devices is changed based on the input. The method flow returns to block 906, so that the changed display information can be displayed at the associated touch screen device. If, at block 908, no input is received, the method flow moves to block 912 and it is determined whether an orientation of the touch screen devices have changed. If so, the method moves to block 914 and the display information for each touch screen device is changed based on the orientation. For example, the display information can be changed to re-orient the displayed information to reflect the change in orientation of the associated touch screen device.

If at block 912 it is determined that the device orientation has not changed, the method flow proceeds to block 916 and it is determined whether a user position relative to one or both of the touch screen devices has changed. If so, the method flow proceeds to block 918 and the display information for one or both touch screens is changed based on the change in user position. In an embodiment, the display information is changed so that the visual display at each touch screen maintains the same orientation with the user as the user changes positions. If, at block 916, it is determined that the user position has not changed, the method flow returns to block 908.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A hand-held information handling system, comprising:
a first touch screen device including a first sensor;
a second touch screen device including a second sensor, wherein the first touch screen device and the second touch screen device are configured to form a substantially discontinuous visual display in a first arrangement and to form a substantially continuous visual display in a second arrangement, and wherein when in the first arrangement the hand-held information handling system is adapted to be used by a first user, and when in the second arrangement the information handling system is adapted to be used by the first user and a second user; and
a processor configured to execute an application, the processor further configured to:
determine with the first sensor a first position of the first user;
display first display information from the application at the first touch screen device in a first orientation based on the first position;
determine with the second sensor a second position of the second user;
display second display information from the application at the second touch screen device in a second orientation based on the second position; and
enlarge a picture displayed on the first touch screen device to be displayed across both the first touch screen device and the second touch screen device when in the second arrangement.

2. The information handling system of claim 1, wherein the first touch screen device is integrated with a lid of a portable computer, and the second touch screen device is integrated with a base of the portable computer.

3. The information handling system of claim 1, wherein the first display information is associated with a first input screen of the application and the second display information is associated with a second input screen of the application.

4. The information handling system of claim 3, wherein:
the application comprises a game application, wherein the first display information is associated with a first game view and the second display information is associated with a second game view; and the information handling system is further adapted in the second arrangement to permit the first user to interact with the game application via the first game view, and to permit the second user to interact with the game application via the second game view.

5. The information handling system of claim 1, wherein the first touch screen and second touch screen are multi-touch screens.

6. The information handling system of claim 1, wherein the first sensor is configured to determine an orientation of the first touch screen and the second touch screen relative to the first user.

7. The information handling system of claim 1, wherein the first sensor is configured to determine a proximity of the first user relative to the first touch screen.

8. The information handling system of claim 1, wherein:
the first sensor is configured to provide input information indicative of changes in an electromagnetic field; and
the processor is configured to change information displayed at the first touch screen based on the input information.

9. A method, comprising:
arranging a portable computer in a first configuration:
receiving first display information from an application;
displaying the first display information at a first touch screen device of the portable computer when the portable computer is in a first arrangement, wherein the first display information is displayed in a first orientation, the first orientation being based on a first signal from a first sensor associated with the first touch screen device, the first signal being based upon a first position of a first user of the portable computer relative to the first touch screen device;
receiving a first interaction from the first user with the first touch screen device;
receiving second display information from the application;
displaying the second display information at a second touch screen device of the portable computer when the portable computer is in the first arrangement, wherein the second display information is displayed in a second orientation, the second orientation being based on a second signal for a second sensor associated with the second touch screen device, the second signal being based upon a second position of a second user of the portable computer relative to the second touch screen device;
receiving a second interaction from the second user with the second touch screen device;
arranging the portable computer in a second configuration; and
displaying the first display information across both the first touch screen device and the second touch screen device when the portable computer is in the second arrangement.

10. The method of claim 9, wherein displaying the second display information comprises displaying the second display information simultaneously with display of the first information.

11. The method of claim 9, further comprising:
determining an orientation of the first touch screen and the second touch screen based on a third signal from the first sensor;
wherein displaying the first display information comprises displaying the first display information based on the orientation of the first touch screen.

12. The method of claim 9, wherein the first interaction represents a multi-touch gesture.

13. The method of claim 9, further comprising:
determining a proximity of the first user based on a third signal from the first sensor; and
changing the first display information based on the proximity.

14. The method of claim 9, wherein the first touch screen is integrated with a lid of the portable computer and the second touch screen is integrated with a base of the portable computer.

15. The method of claim 9, further comprising:
changing the first display information and the second display information in response to determining that the first touch screen and the second touch screen form a substantially continuous visual display.

16. A method comprising:
in a first arrangement of a hand-held computer wherein a first touch screen device of the hand-held computer is configured substantially discontinuously from a second touch screen device of the hand-held computer:
determining a first position of a first user of the hand-held computer based upon a first input from a first sensor of the first touch screen device;
in response to determining the first position, displaying first display information from an application at the first touch screen device in a first orientation, and second display information from the application at the second touch screen device in a second orientation; and
receiving a first input to the application based upon a first interaction from the first user at the first touch screen device; and
in a second arrangement of the hand-held computer wherein the first touch screen device is configured substantially continuously with the second touch screen device:
determining a second position of the first user based upon a second input from the first sensor;
determining a third position of a second user of the hand-held computer based upon a third input from a second sensor of the second touch screen device;
in response to determining the second and third positions, displaying third display information from the application at the first touch screen device in a third orientation, and fourth display information from the application at the second touch screen device in a fourth orientation;
receiving a second input to the application based upon a second interaction from the first user at the first touch screen device; and
receiving a third input to the application based upon a third interaction from the second user at the second touch screen device.

17. The method of claim 16, wherein the first touch screen device is integrated with a base of the hand-held computer, and the second touch screen device is integrated with a lid of the hand-held computer.

18. The method of claim 16, wherein:
the application comprises a game application, wherein the third display information is associated with a first game view and the fourth display information is associated with a second game view;
the second interaction is based upon a response by the first user to the first game view; and
the third interaction is based upon a response by the second user to the second game view.

19. The method of claim 16, in the first arrangement further comprising:
 determining a fourth position of the first user of the handheld computer based upon a fourth input from the first sensor;
 receiving a first input to the application based upon a first interaction from the first user at the first touch screen device; and
 in response to determining the fourth position, displaying fifth display information from the application at the first touch screen device in a fifth orientation, and sixth display information from the application at the second touch screen device in a sixth orientation.

20. The method of claim 16, wherein the first sensor is configured to provide input information indicative of changes in an electromagnetic field.

* * * * *